United States Patent [19]

Kanner et al.

[11] Patent Number: 4,789,564

[45] Date of Patent: Dec. 6, 1988

[54] HYDRIDOAMINOSILANE TREATMENT FOR RENDERING SURFACES WATER-REPELLENT

[75] Inventors: Bernard Kanner, West Nyack; Roswell E. King, III, Pleasantville, both of N.Y.; Steven P. Hopper, Glen Ellyn, Ill.

[73] Assignee: Union Carbide Corporation, Danbury, Conn.

[21] Appl. No.: 32,377

[22] Filed: Mar. 31, 1987

[51] Int. Cl.$^4$ .................. B05D 3/02; C23C 16/00
[52] U.S. Cl. .................. 427/255.6; 427/255; 427/387; 427/391; 427/392; 427/393.4; 427/421
[58] Field of Search .................. 427/255.6, 387, 393.4, 427/391, 389.9, 392, 393.5, 421, 255

[56] References Cited

U.S. PATENT DOCUMENTS

| | | | |
|---|---|---|---|
| 2,306,222 | 12/1942 | Patnode | 117/106 |
| 2,386,259 | 10/1945 | Norton | 117/121 |
| 2,405,988 | 8/1946 | Barry | 260/462 |
| 2,412,470 | 10/1946 | Norton | 117/106 |
| 2,474,704 | 6/1949 | Thayer | 99/141 |
| 2,532,559 | 12/1950 | Klein | 117/123 |
| 2,566,363 | 9/1951 | Pedlow et al. | 260/488.8 |
| 2,579,416 | 12/1951 | Cheronis | 260/2 |
| 2,782,090 | 2/1957 | Robbart | 8/116 |
| 2,824,778 | 2/1958 | Robbart | 8/116 |
| 2,961,338 | 11/1960 | Robbart | 117/55 |
| 3,432,488 | 3/1969 | Finkbeiner et al. | 260/212 |
| 3,856,558 | 12/1974 | Robbart | 117/106 |
| 4,128,675 | 12/1978 | Rossler et al. | 427/393.4 |
| 4,255,348 | 3/1981 | Herdle et al. | 556/410 |
| 4,339,479 | 8/1982 | Vick et al. | 556/410 |
| 4,345,088 | 8/1982 | Vick et al. | 556/410 |
| 4,377,608 | 3/1983 | Dandt et al. | 427/350 |
| 4,485,206 | 11/1984 | Inoue et al. | 524/723 |
| 4,491,669 | 1/1985 | Arkles et al. | 556/410 |
| 4,496,754 | 1/1985 | Kanner et al. | 556/420 |
| 4,551,385 | 11/1985 | Robbart | 428/323 |
| 4,558,146 | 12/1985 | Kanner et al. | 556/410 |
| 4,678,688 | 7/1987 | Itoh et al. | 427/387 |

FOREIGN PATENT DOCUMENTS 753603 2/1967 Canada.
WO8502205 5/1985 PCT Int'l Appl..
593727 10/1947 United Kingdom.

OTHER PUBLICATIONS

"Wettability", Evaluation of: AATCC Technical Manual 1947, 1952, 1971, 1974 and 1977.
"Surface Modification of Inorganic Materials via Treatment with Tris(Dimethylamino)Silane—Application for Preparation of Antifoams", S. P. Hopper.
"Tert-Alkoxyaminosilanes", C. S. Miller, Jr., L. A. Bryan, R. P. Holysz, Jr. and G. W. Pedlow, Jr., The Miner Laboratories, Chicago, Ill., Industrial and Engineering Chemistry, vol. 39, No. 11, pp. 1368–1371.

*Primary Examiner*—Sadie Childs
*Attorney, Agent, or Firm*—Eugene C. Trautlein

[57] ABSTRACT

Surfaces containing hydroxyl groups are rendered water-repellent through exposure to hydridoaminosilanes of the general formula $$H_xSi(NRH)_y(NR_2^1)_{3-y}$$

In particular, tris(dimethylamino)silane and its derivatives have been found to make substrates with hydroxyl-containing surfaces hydrophobic without adversely effecting the physical properties of the substrate being treated and without the necessity of and pre- or post-treatment steps (i.e. moisturizing, neutralizing, etc.).

32 Claims, No Drawings

൪,൭൮൯,൫൬൪

HYDRIDOAMINOSILANE TREATMENT FOR RENDERING SURFACES WATER-REPELLENT

BACKGROUND OF THE INVENTION

1. Field of the Invention

The present invention generally relates to an aminosilane treatment for rendering surfaces water repellent. More specifically, the present invention relates to the treatment of substrates with hydroxyl containing surfaces such as paper, textiles, cellulosics, and certain inorganic substrates such as silica or alumina with hydridoaminosilanes and certain derivatives thereof to impart an unexpected water repellency to the treated surface. The hydridoaminosilane treated surfaces are devoid of degradative reaction side products. No pretreatment of the surfaces to be rendered water-repellent is required and post treatment is not necessary to remove unwanted reaction side products.

2. Prior Art

It has been known for decades that the vapor phase treatment of hydroxy containing surfaces with organosilicon halides renders the surfaces water repellent. A thorough account describing the methods of this technique and the basic principles involved is set forth in "Chemistry and Technology of Silicones", Noll, W., Academic Press, N.Y. (1968) p. 585. The original patents in this area were first obtained by Patnode (U.S. Pat. No. 2,306,222) and Norton (U.S. Pat. No. 2,412,470). This method has been demonstrated to be successful but requires additional processing steps to completely remove the severely degradative hydrogen halide reaction by-product. Post-treatment process steps such as washing with an aqueous alkali reagent as described by Patnode in U.S. Pat. No. 2,306,222 or treatment with ammonia vapor as described by Norton in U.S. Pat. No. 2,412,470 or rinsing with a concentrated bicarbonate solution as described by Robbart in U.S. Pat. No. 2,783,090 are time consuming and uneconomical. These post treatment processing steps were later eliminated by maintaining careful control over the time temperature conditions during organosilicon halide the treatment as described by Robbart in U.S. Pat. No. 2,824,778 or by limiting the treatment of cellulosic materials to those with a narrow range of moisture content as noted by Robbart in U.S. Pat. No. 3,856,558. These methods described by Robbart are employed so that the hydrogen halide liberated by the reaction of the organosilicon halide with the hydroxyl groups of the cellulose is not immediately dissolved in the moisture containing cellulose. Nevertheless, the hydrogen halide by-product is subsequently removed, not by a chemical method, but a mechanic method such as blow-drying, heating, or a combination of both. Regardless of whether the method is chemical or mechanical, the hydrogen halide reaction by product must be removed before degradation of the treated material occurs. These methods render the overall process intrinsically more complicated.

Other methods which describe the formation of polysiloxane coatings on the surface with other silane derivatives without the subsequent liberation of such degradative reaction products are known. The methods include the use of organoacetoxysilanes as described by Barry in U.S. Pat. No. 2,405,988, organoisocyanatosilanes as described by Klein in U.S. Pat. No. 2,532,559, organoaminosilanes as described by Gilkey in Belgium Pat. No. 657,145, tert-alkoxy aminosilanes as described by Pedlow in U.S. Pat. No. 2,566,363, and alkoxysilanes as described by Thayer in U.S. Pat. No. 2,474,740. These polysiloxane coatings impart a water repellency to the surfaces which they are applied.

In each of these patents it is recognized that the preferred silicon compounds are those which contain at least one non-hydrolyzable organic group attached to the silicon. The remaining groups are preferably readily hydrolyzable. The silicon compound attaches itself to the surface via the formation of silicon oxygen surface bonds by the reaction of surface hydroxyl groups with the hydrolyzable group attached to the silicon, thereby releasing the hydrolyzable group. Once the silicon compound is attached to the surface, the non hydrolyzable organic groups are forced directly outwards. These highly oriented organic groups impart the desired water repellent action of the organosiloxane film. Compounds lacking non-hydrolyzable groups such as $SiCl_4$ or $HSiCl_3$ are useless as hydrophobizing agents by themselves, but are useful as crosslinking agents in forming a tighter polymeric network derived from organosilicon halides. This is taught by Norton in U.S. Pat. No. 2,412,470.

An exception to this art is put forth by Pedlow in U.S. Pat. No. 2,556,363 prescribing the use of tert-alkoxyaminosilanes for imparting water repellency to a variety of surfaces. It is immediately recognizable that the tert alkoxyaminosilanes preferred do not contain non-hydrolyzable groups attached to silicon; however, the tert-alkoxy groups are much less readily hydrolyzed than the amine group. The corresponding water repellent action these compounds impart is then assumed to be due to the polyalkoxylsiloxane coating formed on the surface derived from the reaction of adsorbed water or surface hydroxyl groups with the readily hydrolyzable Si—N bond of the monomeric silane. The liberated ammonia is removed by aqueous washing and/or drying, a post processing step.

Other methods describe the use of aminosilanes to render surfaces water repellent in the form of polysilazanes as is taught by Cachemaille in British Pat. No. 593,727 or Cheronis in U.S. Pat. No. 2,579,416; nevertheless, this method is not substantially different in principle from the employment of monomeric organosilicon halides. In light of the fact that polysilazanes are oligomeric aminosilanes, and therefore of higher molecular weight, their use is usually restricted to liquid phase applications applied either neat or dissolved in an inert solvent.

OBJECT OF THE INVENTION

The object of the present invention is to provide a treatment for rendering surfaces water-repellent without the need for a surface pretreatment or post-treatment.

Another object of the present invention is to provide a treatment for rendering surfaces water-repellent which treatment takes place in the liquid of vapor-phase.

Another object of the present invention is to provide a water-repellency to the surface having good durability and being substantially without surface degradation.

Other objects and advantages of the present invention will be made apparent from the detailed description and examples which follow.

SUMMARY OF THE INVENTION

The present invention provides an aminosilane treatment of hydroxyl containing surfaces for rendering such surfaces water repellent. The amioosilane treatment has been found to allow the material being treated to retain its physical characteristics (i.e. strength, fraying) while eliminating the need for a subsequent post treatment step, such as neutralization or fixing. The aminosilane utilized is a hydridoaminosilane and it can be applied to the surface in vapor or liquid form.

DETAILED DESCRIPTION OF THE INVENTION

In accordance with the present invention there is provided, for treating the hydroxy-containing surfaces, a hydridoaminosilane of the general formula:

$$H_xSi(NRH)_y(NR_2^1)_{3-y}$$

wherein R is an alkyl group of the formula $C_nH_{2n+1}$ and n has a value of 1 to 18, preferably 1 to 6. R is generally linear, but it may be branched as well. $R^1$ is an alkyl group of from 1 to 6 carbon atoms, preferably $R^1$ is a methyl group; x has a value of 1 or 2, preferably 1; y has a value of 0 to 3, preferably 0; and the sum of $x+y=4$.

The hydridoaminosilanes set forth above can be prepared by the reaction between dialkylamine, preferably dimethylamine, with copper-activated silicon as described in U.S. Pat. No. 4,255,348. Suitable hydridoaminosilanes so prepared include bis-dimethylaminosilane and tris dimethylaminosilane. Related aminosilane derivates of the reaction product can be prepared by transamination as set forth in Acta. Chem. Scand. 13 (1959). Suitable among such aminosilanes include bis(methylamino)(dimethylamino)silane, bis(-dimethylamino)(methylamino)silane, tris(methylamino)silane, tris(isobutylamino)silane, and tris(-hexylamino)silane.

Surfaces which contain surface hydroxyl groups can be rendered water repellent by a straightforward application of the hydridoaminosilane to the surfaces as a vapor, mist, aerosol, dilute or concentrated solution or as a neat liquid. No pretreatment step to impart certain characteristics to the surface to be treated is required, such as exposure to high humidity to increase moisture content. Likewise, post-treatment steps are unnecessary to remove a degradative or harmful reaction by-product. Heat may optionally be applied directly to the surface to remove solvent without impairing the performance of the hydrophobing agents. Atmospheres containing high humidity have no impairing effect on the treated surfaces. Materials treated with the preferred hydridoaminosilanes are for the most part immediately water repellent. Numerous examples of such normally non-water repellent materials that can be treated include a variety of types and grades of paper, cotton, linen, silk, wool, cotton blends with synthetic fibers, and cellulosic materials such as wood and cellophane. In addition, it is believed that inorganic materials such as silica, alumina, magnesia and zirconia could be rendered hydrophobic by a hydridoaminosilane treatment.

In general, it is preferred that the hydridoaminosilanes be applied as a vapor because it is the most straightforward, rapid, and economical method to treat the surface. The vapor method is not narrowly limited to the use of homogeneous gas phase hydridoaminosilanes but may be considered to include mists (where some of the hydridoaminosilane has condensed) or aerosols (where the hydridoaminosilane is applied in admixture with an unreactive solvent). The method of generating the gas, mist, or aerosol is secondary to the overall and more important aspect of vapor phase treatment. The use of hydridoaminosilanes is, nevertheless, not limited to a vapor phase treatment and similar results may be obtained by bringing the material to be treated into direct contact with a liquid mixture of the hydridoaminosilicon compounds or mixture of compounds. This method may be substituted by using a solution of the hydridoaminosilanes dissolved in an inert solvent such as an ether, hydrocarbon, chlorinated hydrocarbon which, in general, is unreactive in so far as the hydrophobitization of the surface is concerned. These solutions which may be as dilute as 0.5 wt %, hydridoaminosilane in inert solvent, may be more desirable for treating porous bodies such as masonry or materials with high surface area such as inorganic fillers including silica, alumina, kaolin, mullite, and the like. Upon drying or evaporation of the inert solvents, these materials are, for most purposes, immediately hydrophobic.

In carrying out the present invention, it is not necessary to undertake a pre-treatment step to give the surfaces to be treated a particular range of water or moisture content. Elaborating, the surface does not have to be pre-treated in an atmosphere of prescribed relative humidity to increase its moisture content.

On the other hand, the surface does not have to be oven-dried to remove excess moisture; however, it must be stipulated that the surface to be treated should not be physically wet to the touch, otherwise the preferred treatment will most likely be less effective. This stipulation is not unique and certainly holds true for other methods of rendering surfaces hydrophobic utilizing acetoxysilanes, alkoxylaminosilanes, or organosilicon halides. There is also no immediate and laborious post-treatment step such as rinsing, neutralization, or blow drying to remove harmful or destructive side products derived from the interaction of the hydridoaminosilane with the surface. Treated surfaces may be allowed to dry by standing in air but may also be exposed to hot air—the final result being the same, i.e., virtually immediate hydrophobilization.

The hydrophobization of hydroxyl containing surfaces by the hydridoaminosilanes is surprisingly efficient. Using hydridoaminosilanes, such as tris(dimethylamino)silane vapors, it was observed that paper is rendered hydrophobic in less than 1 minute of exposure at ambient temperatures. The hydrophobic effect was observed to last for more than six weeks in an atmosphere containing no less that 50% relative humidity. This result was unexpected in light of the fact that all the groups attached to silicon are nominally readily hydrolyzable. In fact, the reaction of hydridoaminosilanes with $H_2O$ gives $SiO_2$, amine, and hydrogen as reaction products. Therefore, the interaction of hydridoaminosilanes with the hydroxyl containing surface may be different than that of organosilicon halides which are known to liberate hydrogen halide and concomitantly form Si—O bonds with the surface. It is the liberated hydrogen halide that is so destructive to the treated material using organosilicon halide thereby requiring the immediate post treatment process step. For all intents and purposes, the liberation of amine (derived from the reaction of hydridoaminosilanes with water or hydroxyl groups on the surface of the substrate) is virtually imperceptible by the sense of smell. Without being limited by theory, this suggests that the hydridoaminosilane treated surfaces are rendered hydrophobic in par by the hydrogen bonding interaction of the hydridoaminosilane with water or the hydroxyl groups on the surface of the substrate and in part by the reaction of hydridoaminosilane with water or hydroxyl groups on the surface, thereby forming a Si—O surface bond. The intimate mechanism of this interaction is not entirely understood but may be a result of lone pair interactions between the nitrogen atom of the hydridoaminosilane and the hydrogen atom of the surface hydroxyl group and between the oxygen atom of the surface hydroxyl groups and the hydrogen atom of the hydridoamino silane. Although this mode of interaction has not been rigorously substantiated by spectroscopic techniques it is a reasonable model to rationalize the experimental results.

To obtain the best results, the surface to be treated should have a moisture content between about 1 percent to approximately 12 percent. The hydridoaminosilane should be added in a sufficient quantity to render the surface hydrophobic. The contact time for the hydrophobizing treatment when the hydridoaminosilane is applied in liquid form is generally anywhere from one second to ten minutes, preferably one to ten seconds. The contact time for the hydrophobizing treatment when the hydridoaminosilane is applied in vapor form is from five seconds to ten minutes, preferably one to three minutes.

Whereas the exact scope of the instant invention is set forth in the appended claims, the following specific examples illustrates certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

EXAMPLES

General Procedure:

The material to be treated was initially measured for its moisture content. Thereafter the surface of the material was exposed to the hydridoaminosilane (or other aminosilicon compound in the case of a comparative example). Contact angle measurements were performed using a Rame-Hart, Inc. goniometer. Hydrophobicity was measured by implementing a variation of AATCC Test Method 39-1977. The procedure outlines the examination of falling water droplets from a fixed height onto the surface of the test specimen. In this particular test, the time required for the specular reflection of the water drop to disappear is measured and recorded as "wetting time." In our variation of this test the wetting of the test specimen was considered a failing test for hydrophobicity. A passing test for hydrophobicity was one in which the beads of water on the test specimen evaporated before wetting the surface.

If the hydrophobicity test was passed, the test specimen was saved and tested again the next day. In some cases samples were re-evaluated weekly for a period of eight weeks to determine the durability of the hydrophobicity. Upon completion of any test period, the specimen was pulled at both ends and examined for fraying and then torn by hand into pieces to determine if the imparted hydrophobicity had a detrimental effect on the strength of the test specimen. This qualitative pull and tear strength test was run in comparison to an untreated test substrate.

Example 1

A strip of Whatman No. 40 filter paper, $\frac{1}{2}"\times 2"$, having an average moisture content of 3.5% +/−0.5%, was exposed to $HSi(NMe_2)_3$ vapors for 5 seconds. The $HSi(NMe_2)_3$ vapors were generated by sparging a neat solution of $HSi(NMe_2)_3$ with dry nitrogen gas through a gas dispersion tube at a rate of 5 standard cubic feet per hour at 70°. The test specimen was tested for hydrophobicity by dropping water from a pipette 2 to 4 inches onto the test specimen. The very round beads of water evaporated off of the test specimen before wetting the surface. The test was repeated the next day with the same results. Pulling and tearing the sample suggested no decomposition of the substrate due to the treatment as compared to an untreated sample.

Example 2

The procedure of Example 1 was repeated except the exposure time was 10 seconds. The paper was tested for hydrophobicity by the water bead evaporation test as described in Example 1 and found to be thoroughly water repellent. The pull and tear test was also performed with similar results.

Example 3

The procedure of Example 1 was repeated except the exposure time was 1 minute. The end results were the same. The test specimen was tested weekly for 8 weeks and found to be thoroughly water repellent in that the water beads would evaporate before wetting the surface. The strength test also showed no noticeable decomposition over the 8 week period.

Example 4

The procedure of Example 1 was repeated except the exposure time was 2 minutes. The hydrophobicity test and strength tests were similar to those of Example 3.

Examples 5-8

The procedure of Examples 1-4 were repeated except the neat solution of $HSi(NMe_2)_3$ was not heated and was kept at 15° to 20° C. Upon exposure of the test specimens to the $HSi(NMe_2)_3$ vapors and subsequent testing for hydrophobicity, all samples were rendered thoroughly water repellent.

The next day the samples were retested for hydrophobicity and each of the samples were thoroughly water repellent except for the sample which had been exposed for only 5 seconds. After thirty seconds, this specimen began to absorb the water bead. The remaining samples were tested the following day and found to be thoroughly water repellent. The strength test suggested no decomposition of the substrate due to the aminosilane treatment.

Example 9

A test specimen from Example 4, a test specimen obtained by dipping a strip of Whatman No. 40 filter paper $\frac{1}{2}"\times 2"$ into a neat solution of $HSi(NMe_2)_3$ and allowed to dry, and an untreated strip of Whatman No. 40 filter paper $\frac{1}{2}"\times 2"$ were analyzed for surface hydroxyl content by diffuse reflectance infrared spectroscopy. The untreated test specimen showed the highest content of surface hydroxyl groups in comparison to the treated samples which showed little or no -OH absorption in the region where this is typically observed, 2900–3200 and 3400–3750 cm$^{-1}$. The difference between little and no —OH absorption in this regions corresponds to the samples treated with HSi(NMe$_2$)$_3$ vapor and neat HSi(NMe$_2$)$_3$ liquid, respectively.

Example 10

The procedure of Example 2 was repeated except the test paper was put into a drying oven at 117° C. for 1 minute after the treatment. The paper was removed from the oven and tested for hydrophobicity and was found to have a thoroughly water repellent surface.

Example 11

The procedure of Example 10 was repeated except the test paper was put into a drying oven at 117° C. for 5 minutes after the treatment. The paper was removed from the oven and was found to have a thoroughly water-repellent surface.

Example 12

The procedure of Example 3 was repeated except that a strip of newspaper print, ½"×2", having a moisture content of 6.7% by weight was exposed to HSi(NMe$_2$)$_3$ vapors for 1 minute. The paper was tested for hydrophobicity 1 minute later and found to be thoroughly water-repellent. The paper was tested once again every week for 8 weeks and found to be thoroughly water-repellent each time. The water beads would evaporate off the paper before they wet the paper.

Example 13

The procedure of Example 2 was repeated except that a strip of 65%/35% polyester/cotton fabric, ½"×2", was exposed to HSi(NMe$_2$)$_3$ vapors for 10 seconds. The fabric was tested for hydrophobicity 1 minute later and found to be thoroughly water-repellent. The water beads evaporated off the fabric before they wet the fabric.

Example 14

The procedure of Example 2 was repeated except that a strip of tissue paper, ½"×2", having a moisture content of 4.7% by weight was exposed to HSi(NMe$_2$)$_3$ vapors for 10 seconds. The tissue paper was thoroughly water-repellent. The water beads evaporated off the tissue paper before they wet the paper. The paper was retested once a week for 8 weeks and was water repellent each time.

Example 15

A 10% (by volume) solution of HSi(NMe$_2$)$_3$ in toluene was prepared. A strip of filter paper, ½"×2", was immersed in the solution for 1 second and allowed to air dry for 15 minutes. The paper was tested for hydrophobicity and found to be thoroughly water repellent. This test was repeated once a week for 8 weeks and the paper was highly water repellent with no apparent physical degradation of strength.

Example 16

A 1% (by volume) solution of HSi(NMe$_2$)$_3$ in toluene was prepared. A strip of filter paper, ½"×2", was immersed in the solution for 1 second and allowed to air dry for 15 minutes. The paper was tested for hydrophobicity and found to be thoroughly water-repellent. This test was repeated once a week with the same result. After the sixth week, the paper began to absorb water.

Example 17

A 0.1% (by volume) solution of HSi(NMe$_2$)$_3$ in toluene was prepared. A strip of filter paper, ½"×2", was immersed in the solution for 1 second and allowed to air dry for 15 minutes. The paper was tested for hydrophobicity and found to be thoroughly water-repellent. This test was repeated once every week with the same result. After the third week the paper began to absorb water.

Example 18

A 50% (by volume) solution of HSi(NMe$_2$)$_3$ in toluene was prepared. Wool sewing thread was immersed in the solution for 15 minutes and air dried. After drying the thread was found to be highly water repellent. All of its original strength and color was maintained.

Example 19

Using the procedure described in Example 18, a strip of 100% white-cotton fabric was immersed in the solution for 15 minutes at 20° C. and air dried. After drying the material was found to be highly water-repellent. All of its original strength and color was maintained.

Example 20

Using the procedure described in Example 18, tissue paper was treated with a 50% solution HSi(NMe$_2$)$_3$ in toluene. After air drying, the paper was found to be highly water repellent. All of its original strength and color was maintained.

Example 21

The treated wood sewing thread from Example 18, the treated 100% cotton fabric from Example 19 and the treated tissue paper from Example 20 were placed in boiling water baths for 75 minutes and then air dried for 2 hours. Each of the surfaces was thereafter tested for hydrophobicity and found to be still water repellent.

Example 22

Using the procedure described in Example 18, four strips of filter paper were immersed for 1 hour in the 50% solution of HSi(NMe$_2$)$_3$ in toluene and then air dried for 1 hour. Each piece of paper was highly water-repellent. One piece of paper was saved as a control; one piece of paper was placed into a beaker of water; one piece of paper was placed in a beaker of pH 2 buffer; and one piece of paper was immersed in a beaker of pH 10 buffer. The three beakers were heated to 75° C for 1 hour. The test papers were removed and allowed to air dry for 2½ hours. The original control piece of filter paper and water treated paper were found to be highly water repellent. The acidic pH 2 buffer treated filter paper was also found to be water-repellent. The basic treated paper was non-hydrophobic.

Comparative Example A

A strip of Whatman filter paper, ½"×", was exposed to vinyl-Si(NMe$_2$)$_3$ vapors at temperatures of 80°, 100°, 120°, 140°, and 160° C. for exposure times of 5, 10, 20, 30 and 60 seconds. The samples were allowed to dry and then tested for their water repellent properties. It was discovered that only those samples which had exposure times greater than 5 seconds at vapor temperatures of 140° C. or higher were observed to exhibit water repellent properties. Even so, these water repellent properties were marginal, at best, and only lasted a period of at least one week but less than two weeks.

Comparative Example B

The procedure of Comparative Example A was followed except that butyl-Si(NMe$_2$)$_3$ was used instead. It was discovered that only those samples which had exposure times greater than 10 seconds at vapor temperatures of 160° C. or higher were observed to exhibit water repellent properties. Even so, these water repellent properties were marginal and only lasted a period of at least one week but less than two weeks.

Comparative Example C

The procedure of Comparative Example A was followed except that isopentyl-Si(NMe$_2$)$_3$ was used instead. It was discovered that only those samples which had exposure times greater than 10 seconds at vapor temperatures of 150° C. or higher were observed to exhibit water repellent properties. Even so, these water repellent properties were marginal and only lasted a period of at least one week but less than two weeks.

Comparative Example D

The procedure of Comparative Example A was followed except that (t-C$_4$H$_9$O)(NMe$_2$)$_2$SiH was used instead. It was discovered that only those samples which had exposue times greater than 5 seconds at vapor temperatures of 80° C. or higher were observed to exhibit water repellent properties. Even so, these water repellent properties were marginal and only lasted a period of four days for samples treated with vapor temperature of 100° C. or higher.

Comparative Example E

The procedure of Comparative Example A was followed except that (t-C$_4$H$_9$O)$_2$(NMe$_2$)SiH was used instead. It was discovered that only those samples which had exposure times greater than 5 seconds at vapor temperatures of 80° C. or higher were observed to exhibit water repellent properties. Even so, these water repellent properties were marginal and only lasted a period of three days, failing the test on the fourth day.

Example 23

Strips of Whatman No. 40 filter paper ½"×2" having a moisture content of 3.5% on the average, were exposed for 1, 2, 3, 4, 5, 6, and 7 minutes of HSi(NMe$_2$)$_3$ vapors generated by sparging a neat solution of HSi(NMe$_2$)$_3$ with dry nitrogen gas at a rate of 0.35 standard cubic feet per hour at room temperature. Sample 1 corresponding to a 1 minute exposure of HSi(NMe$_2$)$_3$ vapors, was not rendered hydrophobic, while samples 2-7 were rendered thoroughly water repellant. Samples 2-7 were re-wetted with water beads and contact angles measurements of 113°, 111°, 112°, 115°, 113° and 115°+/−5° were respectively observed for the samples.

Comparative Example F

Toluene solutions of Si(NMe$_2$)$_4$ were prepared as described in Example 23. The Whatman filter paper samples were treated with the aminosilane solution and then tested for hydrophobicity in a similar fashion. None of the test samples were rendered water repellent with this particular aminosilane treatment.

Comparative Example G

Toluene solutions of HSiMe(NMe$_2$)$_2$ were prepared as described in Examples 15, 16 and 17 of respective concentrations of 10%, 1% and 0.1%. The Whatman filter paper samples were treated with the aminosilane solution and then tested for hydrophobicity in a similar fashion. The test strips treated with the 10% and 1% aminosilane solutions were thoroughly water repellent. The test strip treated with the 0.1% aminosilane solution absorbed the water beads immediately.

We claim:

1. A method for rendering substrates containing surface hydroxyl groups water repellant which method comprises contacting said surfaces with a hydridoaminosilane of the formula:

$$H_xSi(NRH)_y(NR_2^1)_{3-y}$$

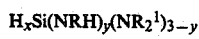

wherein R is an alkyl group of the formula $C_nH_{2n+1}$ wherein n has a value of 1 to 18, R$^1$ is an alkyl group of from 1 to 6 carbon atoms, x has a value of 0 to 3 and the sum of x+y=4.

2. The method of claim 1 wherein n has a value of 1 to 6.
3. The method of claim 2 wherein n is 1.
4. The method of claim 1 wherein R$^1$ is methyl.
5. The method of claim 1 wherein y is zero.
6. The method of claim 1 wherein the hydridoaminosilane is in the gas phase.
7. The method of claim 1 wherein the hydridoaminosilane is applied as a mist.
8. The method of claim 1 wherein the hydridoaminosilane is applied as an aerosol.
9. The method of claim 1 wherein the surface has a moisture content between 1 to 12 percent.
10. The method of claim 1 wherein the contact time lasts from one second to ten minutes.
11. The method of claim 10 wherein the hydridoaminosiline is applied in vapor form and the contact time lasts from one to three minutes.
12. The method of claim 10 wherein the hydridoaminosiline is applied in liquid form and the contact time lasts from one to ten seconds.
13. A method for rendering substrates containing surface hydroxyl groups water repellant which method comprises contacting said substrate continuously through a substantially saturated vapor phase of a hydridoaminosilane of the formula:

$$H_xSi(NRH)_y(NR_2^1)_{3-y}$$

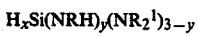

wherein R is an alkyl group of the formula $C_nH_{2n+1}$ wherein n has a value of 1 to 11, R$^1$ is an alkyl group of from 1 to 6 carbon atoms, x has a value of 0 to 3 and the sum of x+y=4.

14. The method of claim 13 wherein n has a value of 1 to 6
15. The method of claim 14 wherein n is 1.
16. The method of claim 13 wherein R$^1$ is methyl.
17. The method of claim 13 wherein y is zero.
18. The method of claim 13 wherein the hydridoaminosiline is in the gas phase.
19. The method of claim 13 wherein the hydridoaminosilane is applied as a mist.
20. The method of claim 13 wherein the hydridoaminosilane is applied as an aerosol.

21. The method of claim 13 wherein the surface has a moisture content between 1 to 12 percent.

22. The method of claim 13 wherein the contact time lasts from one second to ten minutes.

23. The method of claim 22 wherein the hydridoaminosilane is applied in vapor form and the contact time lasts from one to three minutes.

24. The method of claim 22 wherein the hydridoaminosilane is applied in liquid form and the contact time lasts from one to ten seconds.

25. A method for rendering substrates containing surface hydroxyl groups water repellant which method comprises contacting said substrate with a hydridoaminosilane dissolved in an inert solvent wherein said hydridoaminosilane is of the formula:

$$H_xSi(NRH)_y(NR_2^1)_{3-y}$$

wherein R is an alkyl group of the formula $C_nH_{2n+1}$ wherein n has a value of 1 to 18, $R^1$ is an alkyl group of from 1 to 6 carbon atoms, x has a value of 0 to 3 and the sum of $x+y=4$.

26. The method of claim 25 wherein n has a value of 1 to 6.

27. The method of claim 26 wherein n is 1.

28. The method of claim 25 wherein $R^1$ is methyl.

29. The method of claim 25 wherein y is zero.

30. The method of claim 26 wherein the surface has a moisture content between 1 to 12 percent.

31. The method of claim 25 wherein the contact time lasts from one second to ten minutes.

32. The method of claim 31 wherein the hydridoaminosilane is applied in liquid form and the contact time lasts from one to ten seconds.

* * * * *